United States Patent

Moncourtois

[11] Patent Number: 6,102,229
[45] Date of Patent: Aug. 15, 2000

[54] MODULAR FLOOR OUTLET

[75] Inventor: Lane Jeffrey Moncourtois, Oak Ridge, N.C.

[73] Assignee: The Whitaker Corporation, Wilmington, Del.

[21] Appl. No.: 09/146,990

[22] Filed: Sep. 3, 1998

[51] Int. Cl.[7] ............................................ H02G 3/12
[52] U.S. Cl. ............................ 220/3.3; 220/3.8; 220/3.9
[58] Field of Search ............................ 220/3.2, 3.4, 3.3, 220/3.5, 3.8, 3.9

[56] References Cited

U.S. PATENT DOCUMENTS

| | | | |
|---|---|---|---|
| 2,732,090 | 1/1956 | Karlin | 220/3.2 |
| 3,495,276 | 2/1970 | Suess | 220/3.3 |
| 4,742,585 | 5/1988 | Logsdon | 4/661 |
| 4,756,695 | 7/1988 | Lane et al. | 439/76 |
| 4,984,982 | 1/1991 | Brownlie et al. | 439/131 |
| 5,122,069 | 6/1992 | Brownlie et al. | 439/131 |
| 5,178,555 | 1/1993 | Kilpatrick et al. | 439/215 |
| 5,392,571 | 2/1995 | Greenfield | 52/126.2 |
| 5,440,841 | 8/1995 | Greenfield | 52/126.2 |
| 5,448,012 | 9/1995 | Jacob | 174/48 |
| 5,628,157 | 5/1997 | Chen | 52/263 |
| 5,630,300 | 5/1997 | Chen | 52/220.5 |
| 5,741,158 | 4/1998 | Reed et al. | 439/536 |
| 5,773,757 | 6/1998 | Kenney et al. | 174/53 |

*Primary Examiner*—Stephen Castellano

[57] ABSTRACT

A modular outlet box 40 is used in a raised or access floor assembly 30 together with standard support modules 86. The modular outlet box 40 has a central base panel 42 with openings 44 in which a duplex receptacle assembly 2 or a dual communications outlet 10 can be mounted. Inclined side panels 60 extend between the base panel 42 and a peripheral bezel 72 that extends around the modular outlet box 40. Openings 62 in these side panels 60 are dimensioned to receive cable mounted RJ communications jacks 14 and MT-RJ fiber optic connectors 24. SC fiber optic connectors 18 can be mounted in channels located on the ends of the base panel 42.

26 Claims, 9 Drawing Sheets

MODULAR FLOOR OUTLET

FIELD OF THE INVENTION

This invention is related to outlets for electrical power, electrical data and fiber optic data that are employed with raised or access floors and to raised floor assemblies with which these outlets are used.

BACKGROUND OF THE INVENTION

Raised or access floors are typically employed in an office where frequent rewiring is necessary when the office is rearranged. These raised or access floors are most often employed where both electrical power cables and data cables are employed. The power and signal cables, both electrical and fiber optic, can be placed in the space or plenum beneath the raised or access floor. Raised floors simplify both initial installation of the electrical system and subsequent modification or rearrangement. The raised floor is placed on top of the permanent subfloor and is not a permanent part of the building structure. Therefore when rewiring is necessary, the raised floor can be at least partially removed and the cables beneath the floor can be rerouted.

One common type of raised or access floor is one in which individual submodules are placed on a concrete subfloor. Two examples of a raised or access floor of this type are shown in U.S. Pat. No. 5,392,571 and U.S. Pat. No. 5,440,841. Another raised floor that combines individual support modules with raceways is shown in U.S. Pat. No. 5,630,300.

Prior art raised or access floors require special outlets for permitting access for connection to the cables beneath the floor. One approach, shown in U.S. Pat. No. 5,392,571 is to cut an opening in one of the existing support modules. This approach however means that the basic support modules must be fabricated so that they can be converted to an outlet module. When the support modules are used with raceways, such as those shown in U.S. Pat. No. 5,630,300, different outlets must be provided for insertion at different locations relative to the raceways separating support modules. Prior art modules of either type have typically limited the number of connectors that can be mounted in each module and also require a large number of different types of outlet modules.

Another approach is to employ an access floor box that is larger than a standard support module. An example of such a module is shown in U.S. Pat. No. 4,984,982. This module pivots relative to the floor and different connector can be mounted side by side in the pivoting door of the modules. These modules are however relatively large and are not easy to incorporate in raised floors such as that shown in U.S. Pat. No. 5,392,571.

SUMMARY OF THE INVENTION

The modular outlet box of the present invention combines the capability of mounting a large number of connectors at a given location in an access floor. The same basic module can also be used to mount several different types of connectors, including duplex receptacles for power wiring, jacks used for twisted wire pairs and fiber optic connectors.

A modular floor outlet according to this invention is used in a raised floor. This modular floor outlet includes a peripheral flange supported by depending legs. Side panels extending between the peripheral flange and a base panel located in the center of the modular floor outlet. The side panels include at least one side opening of sufficient size to receive a data communications connector, such as an RJ style jack or an MT-RJ fiber optic connector. The base panel includes at least one base opening of sufficient size to receive a duplex receptacle or a dual communications outlet of the type that can be mounted in a conventional outlet box.

A modular outlet box is used in mounting electrical outlets beneath the raised floor. This outlet box includes a central panel located below an peripheral bezel that is configured to be substantially coplanar with the surface of the access floor. At least one inclined surface or panel, extends between the bezel and the central base panel. A duplex receptacle can be mounted in one of the base panel openings. Other openings in the inclined panel are dimensioned to receive a communications jack or a fiber optic connector.

DESCRIPTION OF THE DRAWINGS

Embodiments of the invention will now be described by way of example with reference to the accompanying drawings, according to which.

DETAILED DESCRIPTION OF THE EMBODIMENTS

Figure 1:
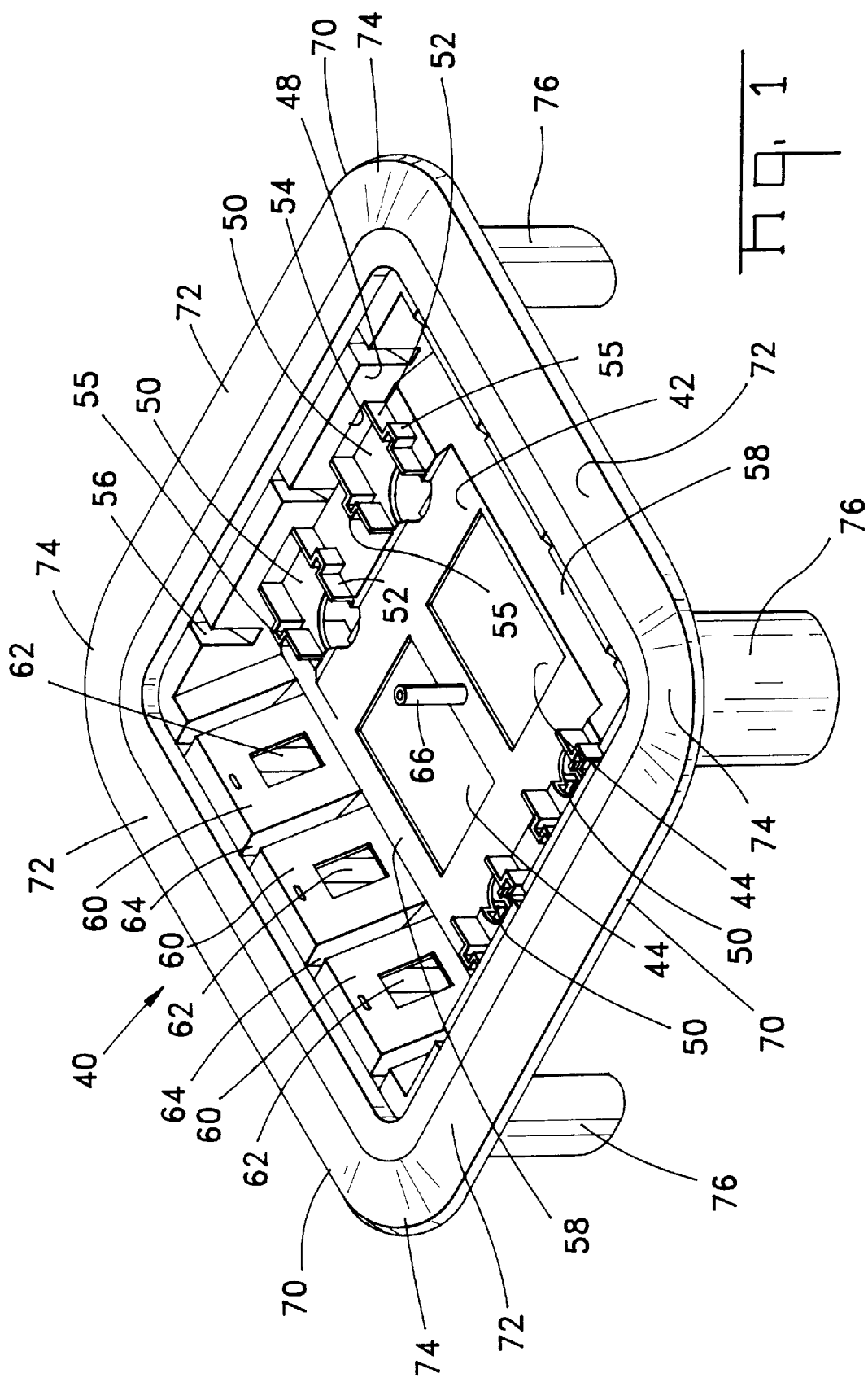
FIG. 1 is a three dimensional view of a modular floor outlet.
Figure 2:
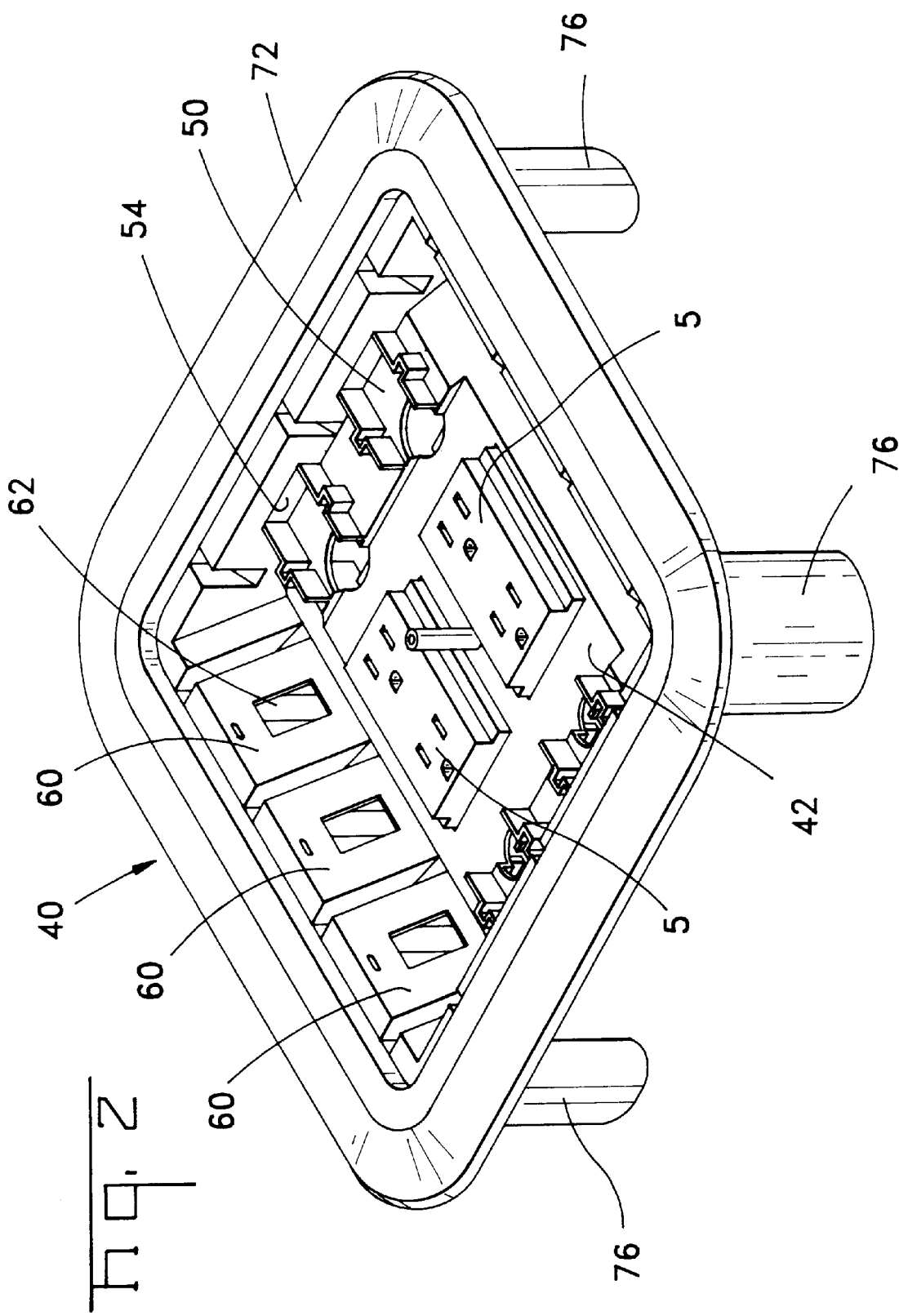
FIG. 2 is a view of the modular floor outlet showing two duplex receptacles located in the openings on the base panel.
Figure 3:
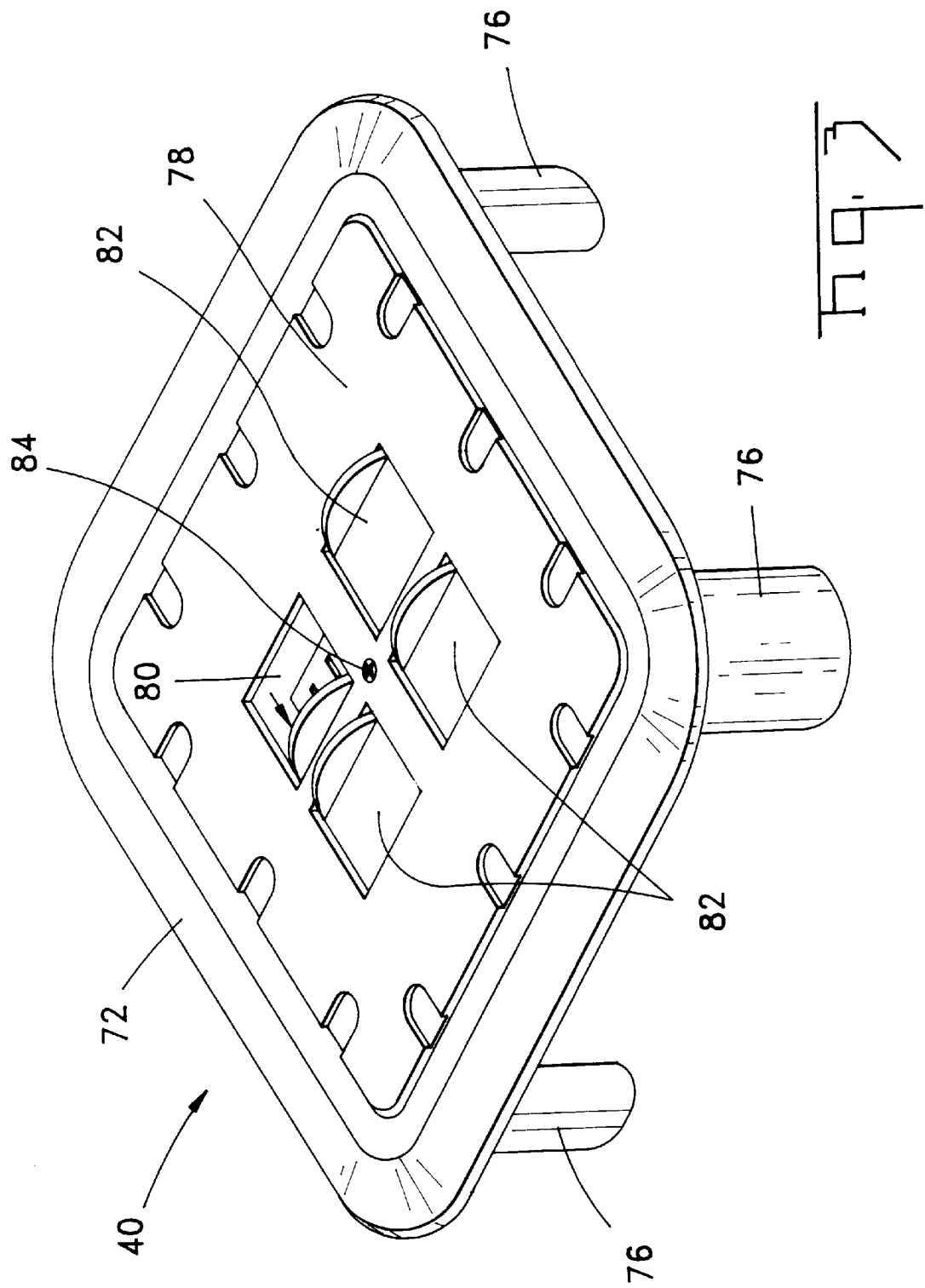
FIG. 3 is a view of the modular floor outlet with a cover positioned on top of the modular floor outlet.

Raised floors can be assembled over existing permanent subfloors to provide space for electrical power wiring and communications wiring including both electrical signal wires and fiber optic cables. The raised floor assembly 30, shown schematically in FIG. 5 and comprising the preferred embodiment of this invention, includes standard support modules 86 that can be replaced by modular outlet boxes or floor pedestal modules 40 at selected locations. A standard support module 86 measures nine (9) inches by nine (9) inches. These support modules 86 are molded from a plastic such as polycarbonate or acrylonitrile-butadiene-styrene (ABS) and have a flat square top that is supported by four legs at each of the corners. The top of the support module 86 is positioned above the sub floor and cables can be laid in the space or plenum beneath the top of the support modules. A support module of this type is shown in U.S. Pat. No. 5,392,571, the disclosure of which in incorporated herein by reference. A support module of this type is available commercially from AMP Incorporated as Part Number 569683-1. For ease of assembly, an eighteen (18) inch by eighteen (18) inch carpet square can be adhesively bonded to a four by four array of support modules, and these subassemblies can be positioned on a subfloor to form a finished carpeted floor.

In the preferred embodiment of this raised floor assembly 30, modular outlet boxes 40 of the modular floor outlets can be positioned at any desirable location. Any one of the support modules 86 can be removed from the four by four array of support modules by simply cutting the section of carpet that bonds that support module 86 to the four by four array. A modular outlet box 40 can then be substituted at that location.

The raised floor assembly 30 would also include a variety of electrical power and electrical and fiber communications cables and connectors that can be employed to deliver service to any location on the floor. Electrical power can be delivered by cables, such as armored cables 7. Data communications cables 28 could employ twisted wires, ribbon cables, coaxial cables or other electrical conductors. According to convention the power cables 7 are laid at right angles relative to the electrical data cables 28 to minimize the possibility of electromagnetic interference. Conventional fiber optic cables 22 can also be deployed beneath the top of the raised floor assembly 30. Again according to convention, the fiber optic cables 22 may be laid either parallel or perpendicular to the power cables 7. To connect peripheral devices to the services provided by these cables and wires, connectors are mounted in the modular outlet boxes 40 dispersed at various locations in the raised floor assembly 30. These connectors can include a duplex receptacle assembly 2 for delivery of electrical power. A dual communications outlet 10 can be employed as an outlet for twisted pair cables, coaxial cables or fiber optic cables. Standard RJ communications jacks 14 attached to twisted pair cables can also be mounted in the modular outlet box 40. The modular outlet box 40 also provides mounting facilities for either SC fiber optic connectors 18 or MT-RJ fiber optic connectors 24. Although the modular outlet box 40 provides space for mounting all of these connectors in the same outlet box, in most applications only a portion of these connectors would be mounted in any one modular outlet box 40. For example, in many applications it would be unwise to mount an unshielded RJ communications connector 14 in the same modular outlet box as a duplex receptacle assembly 2 because of the potential for electrical interference on the unshielded data communications line. However, the versatility of the modular outlet box 40 permits all of these needs to be satisfied by the same component that can provide access for any combination of these services at any desired location.

Figure 6:
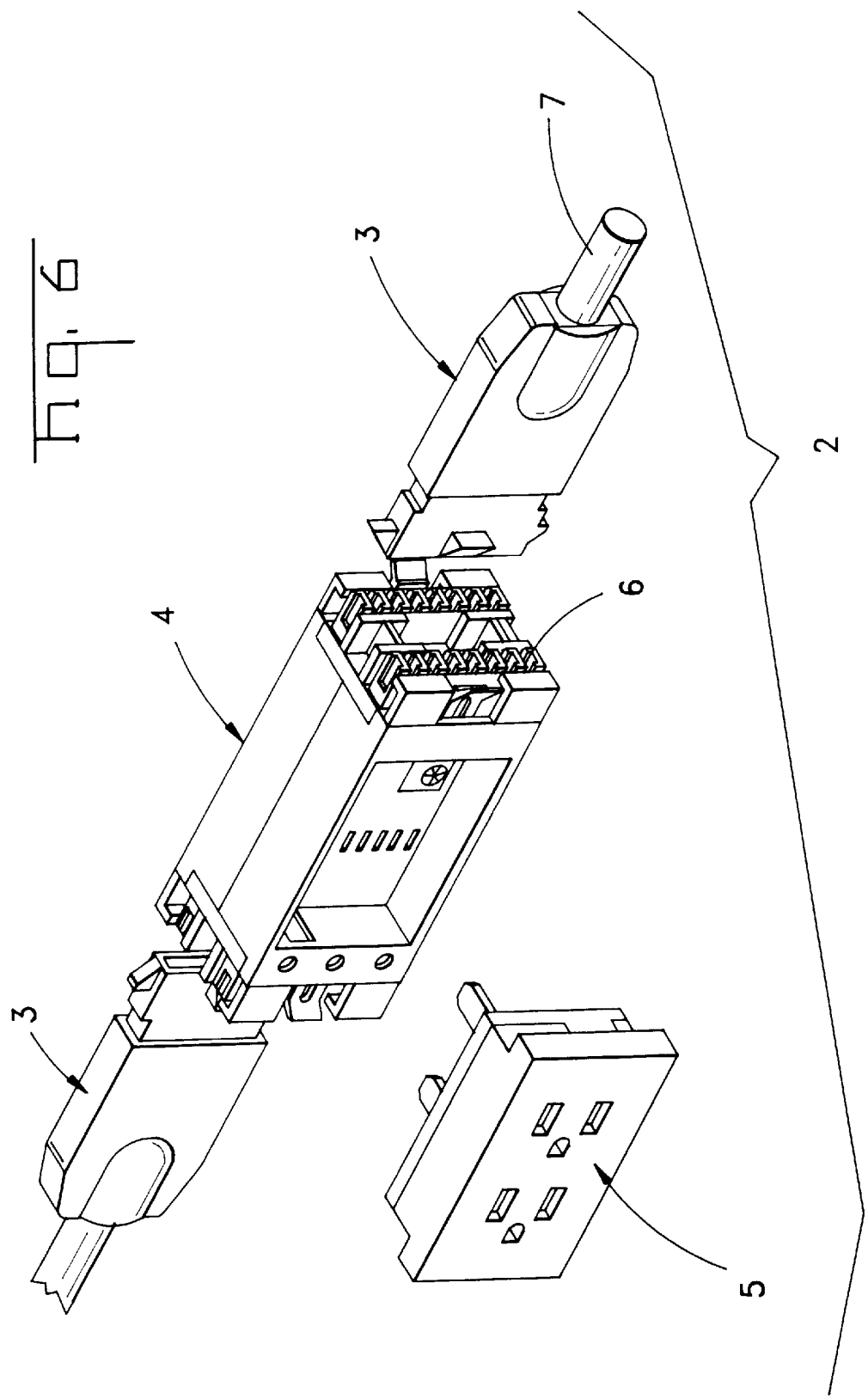
FIG. 6 is a view of a duplex receptacle assembly attached to an armored cable that can be mounted in one of the openings on the base panel of a modular floor outlet.

To deliver electrical power to a location where a modular outlet box 40 is located, a duplex receptacle assembly 2 shown in FIG. 6 can be employed. This duplex receptacle assembly 2 includes a junction box 4 to which a duplex insert 5 can be connected. The junction box 4 also includes a socket or mating interface 6 to which a plug connector 3 can be connected. The plug connector 3 is attached to the power conductors in an armored cable 7 of the type used to deliver electrical power in many applications. This duplex receptacle assembly 2 is a standard commercially available product manufactured by AMP Incorporated as components of the AMPINNERGY modular wiring system. AMPINNERGY is a trademark of The Whitaker Corporation. For example, the preferred embodiment of the junction box 4 is Part Number 556888-1 manufactured by AMP Incorporated, and the preferred duplex insert 5 is AMP Incorporated Part Number 556116-1.

Figure 7:
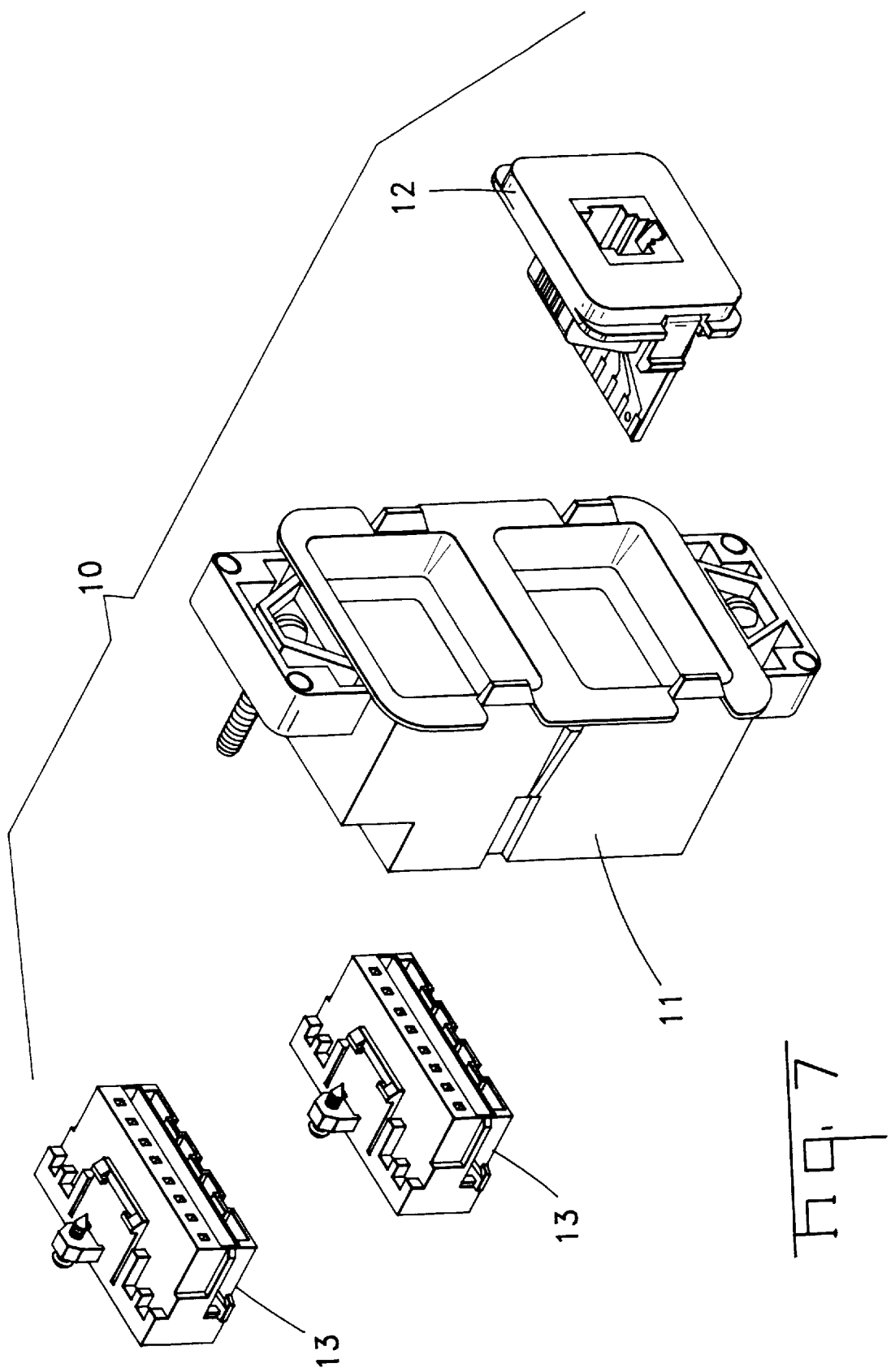
FIG. 7 is a view of a dual communications outlet that can be mounted in one of the openings on the base panel of the modular floor outlet.

A dual communications outlet 10 that can be mounted in the modular outlet box 40 in a similar manner to the duplex receptacle assembly 2 is shown in FIG. 7. This dual communications outlet 10 includes a mounting frame 11, modular inserts 12 and cable connectors 13. The modular inserts 12 can be mated with cable connectors 13 that are attached to a data communications cable 28 that would include twisted pair wires. In an alternate embodiment a coaxial insert can be attached directly to a coaxial cable by conventional male and female coaxial connectors. One embodiment of the dual communications outlet 10 is available as the ACO Installation Kit, Part Number 406090-1 from AMP Incorporated. Other similar versions are also commercially available. Both shielded and unshielded dual communications outlets 10 and data communications cables 28 can be employed. A dual communications outlet 10 of this type is disclosed in U.S. Pat. No. 4,756,695, which is incorporated herein by reference.

Figure 4:
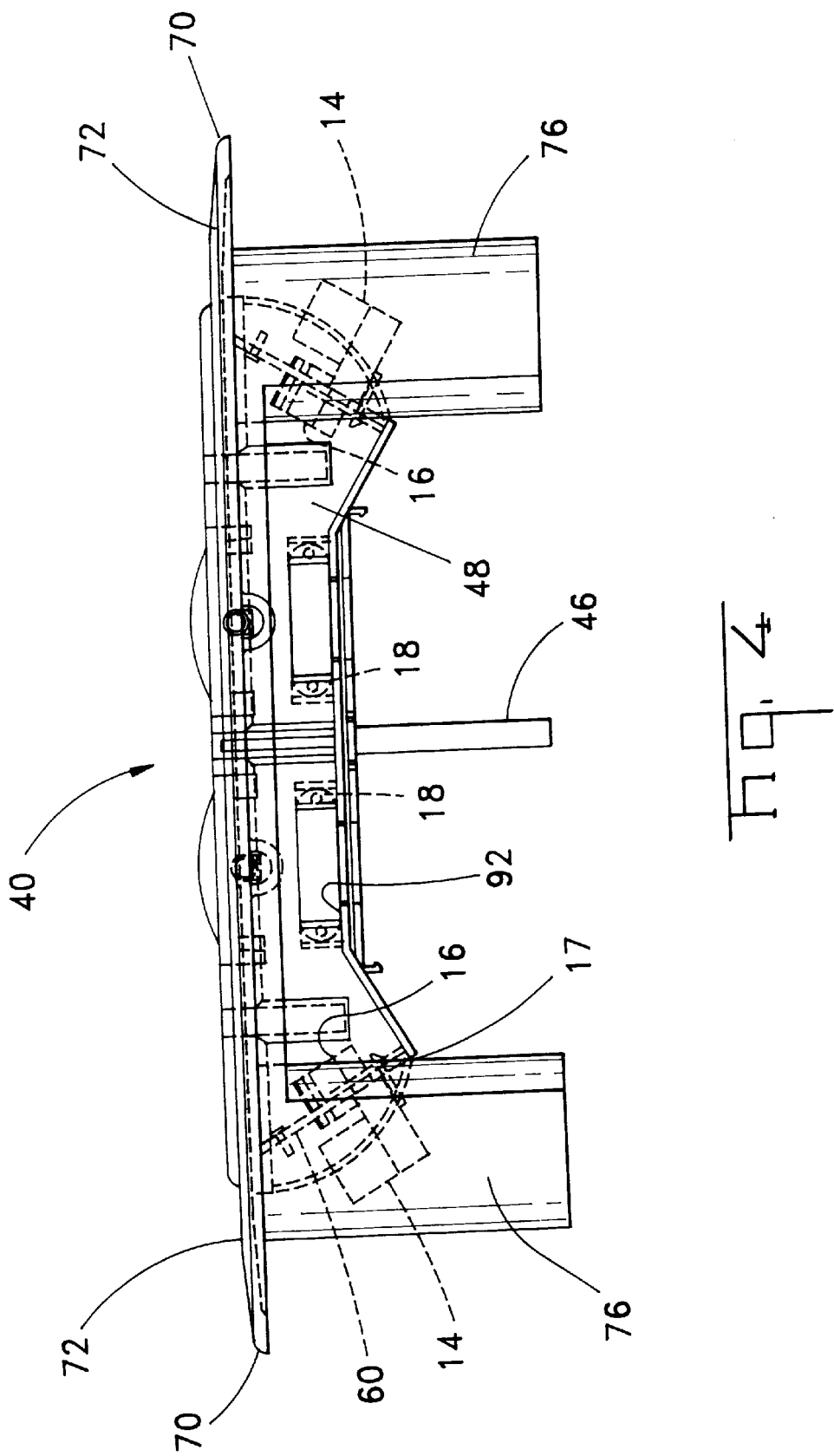
FIG. 4 is a side view of the modular floor outlet showing an RJ communications jack positioned in an opening in an inclined side panel.
Figure 8:
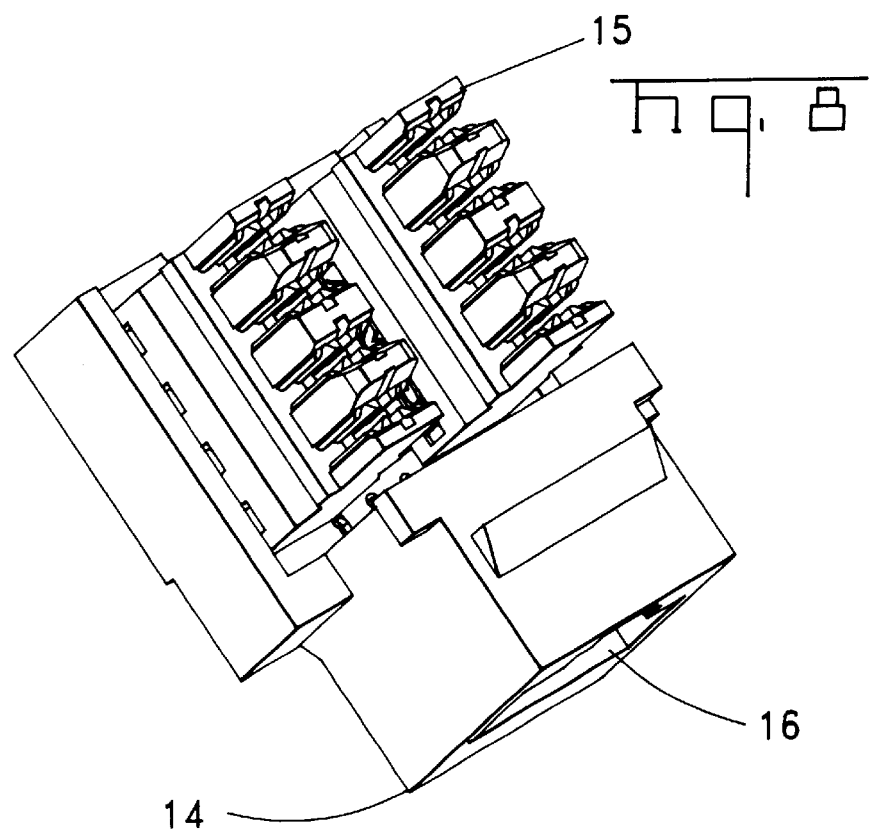
FIG. 8 is a view of an RJ communications jack that can be attached to a data communications cable and mounted in one of the openings in a side panel of the modular floor outlet.

FIG. 8 shows a cable mounted signal communications jack 14. This communications jack 14 is a standard RJ type jack or modular jack and includes a mating opening 16 on the front of the jack 14 for receiving a standard modular or RJ type plug. The preferred embodiment of jack 14 also includes a standard 110 style wire connecting block 15 on the rear of the jack for connecting multiple twisted pair wires to the jack. A mounting tab 17 for mounting the jack 14 in a rectangular opening is best seen in FIG. 4. A jack of this type is available from AMP Incorporated as Part Number 406372-1.

Figure 9:
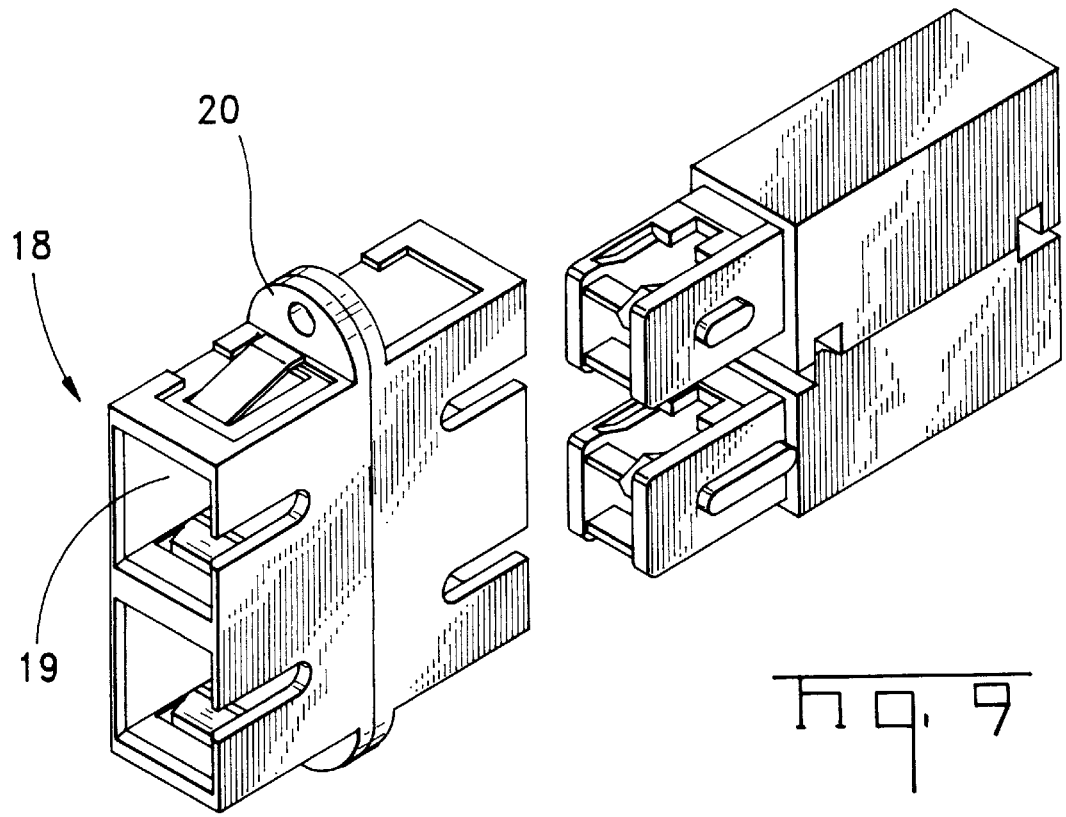
FIG. 9 is a view of an SC fiber optic connector that can be mounted in one of the channels on the base panel of the modular floor outlet.

The modular outlet box 40 provides for mounting two different types of standard fiber optic connectors. The first such connector is the standard SC style fiber optic connector 18 shown in FIG. 9. This SC fiber optic connector includes a mating face 19 that faces toward the interior when mounted in the modular outlet box 40 and a mounting flange 20. A SC/SC bulkhead connector of this type is available from AMP Incorporated as Part Number 504640-1.

Figure 10:
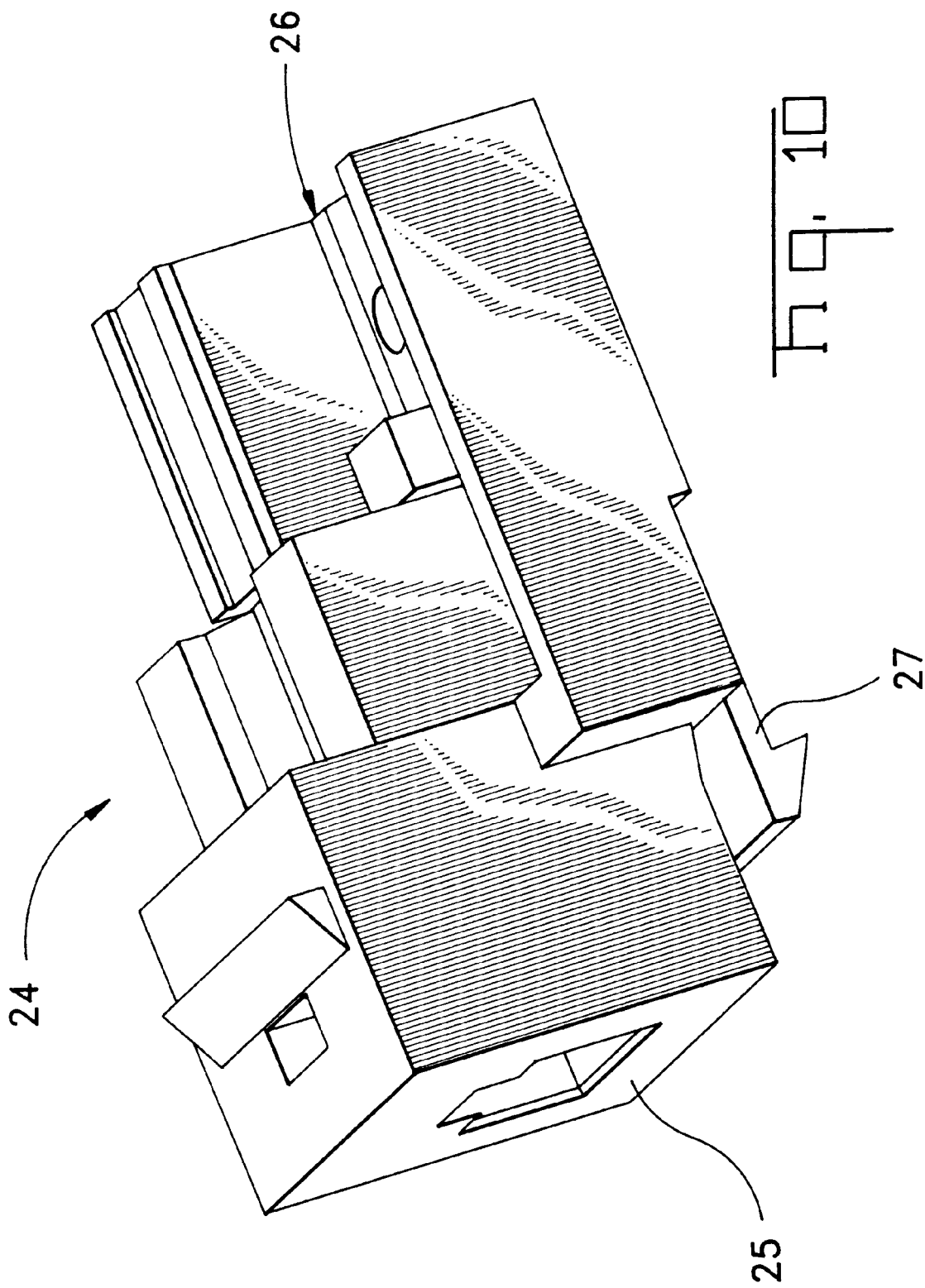
FIG. 10 is a view of an MT-RJ fiber optic connector that can be attached to a data communications cable and mounted in one of the openings in a side panel of the modular floor outlet.

The second fiber optic connector is the MT-RJ connector 24 shown in FIG. 10. This connector has an inwardly facing mating face 25 and a cable attachment face 26 with a mounting tab 27 located between the two oppositely directed faces. For the purposes of this invention, the significant aspect of the MT-RJ connector 24 is that it can be mounted in the same opening as the cable mounted RJ twisted pair jack 14.

An individual unpopulated modular outlet box 40 of the modular floor outlet is shown in FIG. 1. This modular outlet box 40 is a single piece unitary member injection molded from a plastic such as polycarbonate or ABS. The modular outlet box 40 is substantially the same size as a 9 inch by 9 inch support module 86. However, the height, width and length of the modular outlet box 40 are all slightly larger than those of the standard support module for aesthetic purposes. The modular outlet box 40 has a peripheral frame, rim or bezel 72 that fits around the edges of the carpet that have been cut to permit replacement of a standard support module 86. This aesthetic bezel 72 accounts for the slight size difference between the two modules.

Modular outlet box 40 has a central or base panel 42 that has two side by side base openings 44. These openings 44 are dimensioned to receive a duplex insert 5 or the rear portion of a dual communications outlet frame 11. When located on a horizontal subfloor, the base panel 42 will also be horizontal. Base panel 42 is recessed from the top of the modular outlet 40 or peripheral frame or bezel 72 to provide space for peripheral device plugs that are connected to the receptacles that are mounted in the modular outlet box 40. For example, sufficient space is provided for a standard plug attached to the end of an electrical power cord to stand upright when inserted into duplex insert 5 without protruding above the top of the modular outlet box 40. The base panel 42 is also raised above the bottom of the modular outlet box 40 to provide room for attachment of cables 7 to duplex receptacle assemblies 2 mounted in one or both of the openings 44 and space for data cables 28 and a dual communications connector 10 that could also be mounted in the openings 44. A molded post 66 extends upward from the center of the base panel 42 so that a cover 78 can be secured to the modular outlet box 40. Molded latches 46, shown in FIG. 4 extend downwardly from the sides of openings 44 to secure either duplex receptacle assemblies 2 or dual communications connectors 10 to the base panel 42.

A downwardly sloping section 58 extends from two opposite sides of horizontal central base panel 42. These downwardly sloping transition sections 58 in turn join upwardly facing inclined side surfaces or panels 60 located on two sides of the base panel 42. In the preferred embodiment these side surfaces 60 comprise a series of coplanar panels that are separated by notches 64 that extend to curved sections joining adjacent side panels 60. A series of inclined openings 62 are located in the center of each side panel 60. In the preferred embodiment, there are six of these separate side panels 60 with six openings 62 located on the modular outlet box 40, with three side by side openings 62 being located on opposite sides. Each of the openings 62 is rectangular and is dimensioned to permit insertion of a standard cable mounted RJ communications jack 14 or an MT-RJ fiber optic connector 24. The openings 62 are located along a side of the modular outlet box 40 that is parallel to the direction in which power cables 7 enter the modular outlet box 40. When modular communications jacks 14, such as RJ jacks are inserted into openings 62 the data cables 28 to which these jacks are attached will extend at right angles relative to the direction of the power cable 7.

Vertical end panels 48 extend upwardly from the two ends of the horizontal base panel 42 between inclined side surfaces 60. These vertical end panels 48 are also segmented by notches 56 extending upwardly from base panel 42. Two slots 54 are located on each of the vertical ends of the modular outlet box 40, and these slots are aligned with channels 50 formed on the base panel 42 by upstanding channel walls 52. These channels 50 and slots 54 are dimensioned to receive a single SC fiber optic connector 18, and grooves 55 are formed in the channel walls 52 to receive the protruding SC mounting flanges 20. Fiber optic cables 22 attached to SC connectors 24 enter and exit the modular outlet box 40 through the aligned slots 54 in vertical walls or panels 48.

Modular outlet 40 has a bezel or peripheral flange 72 that extends completely around the square upper surface. This bezel or flange 72 extends over the cut edges of the carpet so that the distance between opposite edges 70 of bezel 72 is slightly larger than the 9 inch width of the standard square support module 82 that is replaced by the modular outlet 40. The modular outlet 40 is supported by this peripheral flange 72 and by the four molded legs 76 that depend from the corners 74. These legs 76 are supported by the permanent subfloor over which the raised flooring assembly 30 extends.

A lip is formed in the inside edge of bezel 72 to permit a cover 78 to be positioned on top of the modular outlet box 40. Cover 78 includes four windows or openings 80 to permit peripheral device cables 29 to exit the modular outlet box. Each of these openings 80 is covered by a door 82 that can be tilted to open the respective window so that one or more peripheral device cables 29 can extend from the modular outlet box 40 to the device that is connected with one of the cables extending beneath the raised floor assembly 30. The cover 78 can be secured to the modular outlet box 40 by a center screw that engages center post 66.

Each modular outlet box 40 can be prewired prior to positioning the modular outlet box 40 in a vacant space created by removal of one of the support modules 86. The duplex receptacle assembly can be prewired by snapping the junction box 4 into an opening 44 on the base panel 42. The latches or straps 46 extending below base panel secure the junction box below the base panel 42. A duplex insert 5 can be positioned in the junction box 4 before or after the junction box is secured in opening 44. A plug connector 3 attached to one end of an armored cable 7 can then be connected through one of the mating interfaces located on either end of the junction box 4. Multiple branch connected duplex receptacles can be connected together because a plug connector 3 attached to another armored cable 7 can then be connected to one of the other mating interfaces 6 on the junction box 4.

A dual communications connector 10 can be assembled in one of the base panel openings 44 is a similar manner. The frame 11 is snapped into the opening 44 and is supported by the latch 46. Inserts 12 can be inserted into the frame 11 from the front before or after the frame is positioned in the opening 44. The cable connectors 13 are attached to a data communications cable 28 prior to insertion into the frame 11. For both the duplex receptacle assembly 2 and the dual communications connector 10 the cables would be routed beneath the raised floor to the location of the modular outlet box 40. After the connectors are positioned and the cables attached the modular floor box 40 is inserted into position in the raised floor assembly 30. Peripheral device cables 29 can then be connected. The mating face of each of the connectors positioned in base openings 44 face toward the middle of the modular outlet box where sufficient space is provided for peripheral device plugs.

An SC fiber optic connector 18 can be positioned in any one of the channels 50 located on the base panel 42 between one of the base openings 44 and the vertical end walls 48. The SC fiber optic connector 18, attached to the end of a fiber optic cable 22 is inserted through the slots 54 and into channels 50. The SC connector flanges 20 fit in the mounting grooves 55 provided in the channel side walls 52. When positioned in this manner, the SC connector mating face 19 faces inward toward the area provided between the base panel 42 and the cover 78 to provide room for a mating connector.

Cable mounted RJ jacks 14 and MT-RJ fiber optic connector 24 are each snapped into the openings 62 on inclined panels 60 from the exterior of the modular outlet box 40. The latches or tabs 17 and 27 on the exterior of these connectors engage the edges of the openings 62 in the manner shown in FIG. 4. The cables attached to these connectors initially extend away from the modular outlet box 40 at a downward angle, and the mating faces 16 and 25 of these connectors face upwardly and inwardly toward the central interior space provided for peripheral device cable connectors.

Not only does this modular outlet box design permit each of the cables and connectors to be mounted in the box before the box 40 is positioned in the raised floor assembly 30, it is possible to mount a connector in all of the openings and channels with the cables radiating outwardly. This modular outlet box 40 can easily be moved to any other position on the raised floor assembly 30 and cables can be rerouted beneath the support modules 86 to simplify rewiring that often occurs when offices are rearranged. Either the outlet box 40 can be repositioned or the four unit assembly including at least one outlet box 40 can be replace another four unit assembly comprising only support modules 86 which can be moved to the location vacated when the outlet box subassembly is moved.

Figure 5:
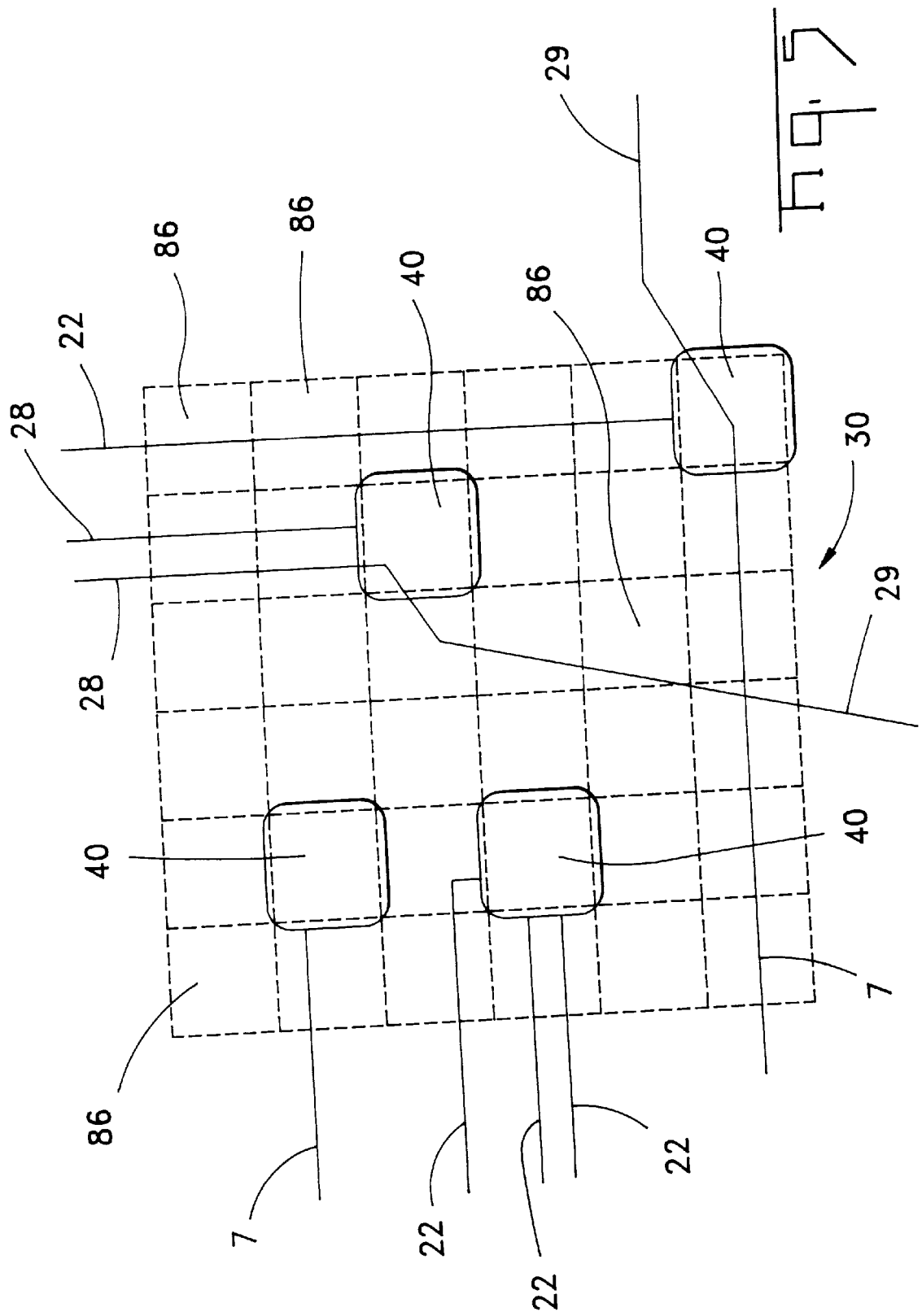
FIG. 5 is a view of a raised floor assembly showing the manner in which electrical power cables and data communications cables can be routed to modular floor outlets located at any position on the raised floor assembly.

Although this modular outlet box 40 is especially adapted for use with a raised floor assembly 30 based on four unit subassemblies as shown in FIG. 5, it should be understood that the modular outlet box 40 can be used in other raised floor assemblies. For example, this modular outlet box 40 could be used in a raised floor assembly including dedicated raceways extending beneath the raised floor. Therefore, the preferred embodiments depicted herein are representative only and the subject matter of the invention is defined by the following claims.

I claim:

1. A module for use in a raised floor comprising: a peripheral flange with opposed side panels extending between the peripheral flange and a base panel located in the center of the module, the base panel including at least one base opening of sufficient size to receive a duplex receptacle, the side panels being inclined relative to the base panel, with vertical end panels extending from the flange to the base panel between the opposed side panels, multiple side openings located in each inclined side panel, and the inclined side panels including at least one of said side openings being of sufficient size to receive a data communications connector.

2. The module of claim 1 wherein the module comprises a one-piece molded member.

3. The module of claim 1 wherein each side panel includes multiple side openings.

4. The module of claim 1 wherein the base panel includes multiple base openings.

5. The module of claim 4 wherein the base openings are rectangular.

6. The module of claim 1 wherein the base panel is located below the flange by a sufficient distance to permit an upright plug to be inserted into a duplex receptacle mounted in a base opening without extending above the flange.

7. The module of claim 1 further comprising a cover mounted on top of the flange.

8. The module of claim 7 wherein the cover includes at least one cable opening.

9. The module of claim 1 wherein two opposed side panels are inclined relative to the base panel with vertical end panels extending from the flange to the base panel between the opposed side panels.

10. The module of claim 1 wherein legs extend downward from the peripheral flange to support the module.

11. A modular floor outlet for a raised floor, the raised floor being provided by base portions of multiple support modules, the support modules having subfloor engaging legs elevating the base portions above a subfloor, the modular floor outlet comprising:

an outlet box for mounting one or more duplex receptacle connectors and for mounting one or more communications connectors, the outlet box fitting in a space in the raised floor;

a peripheral flange for supporting the outlet box in the space in the raised floor;

the outlet box having a first panel and at least a second panel, the first panel and the second panel being recessed below the peripheral flange;

the first panel having one or more first connector receiving openings, each of the first connector receiving openings being adapted for mounting at least one of the duplex receptacle connectors for termination to at least one power cable that enters the modular floor outlet in a first direction; and the second panel having one or more communications connector receiving openings, the second panel extending parallel to the first direction in which the power cable enters the modular floor outlet, and each of the communications connector receiving openings being adapted for mounting at least one of the communications connectors for termination to at least one data communications cable that enters the modular floor outlet in a second direction at a sufficient angle to the power cable to minimize electromagnetic interference.

12. The modular floor outlet as recited in claim 11, wherein the first panel and the second panel are recessed below the level of the raised floor, and the peripheral flange is supported on the raised floor.

13. The modular floor outlet as recited in claim 11, wherein the first panel is horizontal, and the second panel is inclined beside the first panel.

14. The modular floor outlet as recited in claim 11, and further comprising: a third panel adapted for mounting one or more fiber optic connectors, each of the fiber optic connectors being adapted for termination to at least one fiber optic cable that enters the modular floor outlet.

15. The modular floor outlet as recited in claim 14, wherein the first panel is horizontal, and the second panel and the third panel are inclined beside the first panel.

16. The modular floor outlet as recited in claim 11, and further comprising: a cover covering the outlet box fitting in the space in the raised floor.

17. The modular floor outlet as recited in claim 11, and further comprising: a cover covering the outlet box fitting in the space in the raised floor, the cover having openings to receive peripheral device cables for connection to the connectors.

18. The modular floor outlet as recited in claim 11, and further comprising: subfloor engaging legs at respective corners of the modular floor outlet.

19. The modular floor outlet as recited in claim 11, wherein the outlet box fits in the space in the raised floor in substitution of one of the support modules.

20. A modular floor outlet comprising:

an outlet box fitting in a space in a raised floor, a peripheral flange for support on the raised floor and supporting the outlet box below the level of the raised floor, the outlet box having a first panel adapted for mounting at least one duplex receptacle connector for termination to at least one power cable that enters the modular floor outlet in a first direction, and the outlet box having a second panel extending parallel to the first direction in which the power cable enters the modular floor outlet, and the second panel being adapted for mounting at least one communications connector for termination to at least one data communications cable that enters the modular floor outlet in a second direction at a sufficient angle to the power cable to minimize electromagnetic interference.

21. The modular floor outlet as recited in claim 20, wherein the first panel is horizontal, and the second panel is inclined beside the first panel.

22. The modular floor outlet as recited in claim 20, and further comprising: a third panel adapted for mounting one or more fiber optic connectors, each of the fiber optic connectors being adapted for termination to at least one fiber optic cable that enters the modular floor outlet.

23. The modular floor outlet as recited in claim 22, wherein the first panel is horizontal, and the second panel and the third panel are inclined beside the first panel.

24. The modular floor outlet as recited in claim 20, and further comprising: a cover covering the outlet box fitting in the space in the raised floor.

25. The modular floor outlet as recited in claim 20, and further comprising: a cover covering the outlet box fitting in the space in the raised floor, the cover having openings to receive peripheral device cables for connection to the connectors.

26. The modular floor outlet as recited in claim 20, and further comprising: subfloor engaging legs at respective corners of the modular floor outlet.

* * * * *